(12) United States Patent
Golding et al.

(10) Patent No.: US 7,694,082 B2
(45) Date of Patent: Apr. 6, 2010

(54) COMPUTER PROGRAM AND METHOD FOR MANAGING RESOURCES IN A DISTRIBUTED STORAGE SYSTEM

(75) Inventors: Richard Andrew Golding, San Francisco, CA (US); Theodore Ming-Tao Wong, Mountain View, CA (US); Omer Ahmed Zaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 11/192,665

(22) Filed: Jul. 29, 2005

(65) Prior Publication Data

US 2007/0028068 A1    Feb. 1, 2007

(51) Int. Cl.
*G06F 12/00* (2006.01)
(52) U.S. Cl. .................... 711/154; 711/170; 710/36; 710/240; 707/1
(58) Field of Classification Search .................. 711/154
See application file for complete search history.

(56) References Cited

U.S. PATENT DOCUMENTS

| 5,640,595 | A | 6/1997 | Baugher et al. |
| 5,802,590 | A * | 9/1998 | Draves ........................ 711/164 |
| 6,275,953 | B1 * | 8/2001 | Vahalia et al. ................ 714/11 |
| 6,768,901 | B1 | 7/2004 | Osborn et al. |
| 2002/0023156 | A1 | 2/2002 | Chujo et al. |
| 2002/0082856 | A1 | 6/2002 | Gray et al. |
| 2003/0037275 | A1 | 2/2003 | Bakke et al. |
| 2004/0030777 | A1 | 2/2004 | Reedy et al. |
| 2004/0187152 | A1 | 9/2004 | Framcis et al. |
| 2004/0193827 | A1 | 9/2004 | Mogi et al. |
| 2004/0225659 | A1 | 11/2004 | O'Brien et al. |
| 2004/0243699 | A1 | 12/2004 | Koclanes et al. |
| 2004/0250010 | A1 | 12/2004 | Chen et al. |
| 2005/0043977 | A1 | 2/2005 | Ahern et al. |
| 2005/0050270 | A1 | 3/2005 | Horn et al. |

* cited by examiner

*Primary Examiner*—Christian P Chace
*Assistant Examiner*—Matthew Bradley
(74) *Attorney, Agent, or Firm*—Samuel A. Kassatly; Shimokaji & Associates, P.C.

(57) ABSTRACT

A resource management system uses a virtual resource pool distributed across a set of storage devices to manage resources in a distributed storage system. The storage devices dedicate a resource in an allocation pool available to the virtual resource pool. The virtual resource pool is a virtual storage server in which an application receives at least a predetermined amount of storage capacity, a predetermined level of performance, or a predetermined reliability, represented by tokens. A virtual resource pool manager gives the tokens to an application. The application transmits the tokens along with the commands to the storage device. The token represents a right to consume up to some limit of resources on a specific storage device in a computing session. The storage device locally tracks resource consumption through the token.

17 Claims, 7 Drawing Sheets

COMPUTER PROGRAM AND METHOD FOR MANAGING RESOURCES IN A DISTRIBUTED STORAGE SYSTEM

FIELD OF THE INVENTION

The present invention generally relates to a distributed computer system having a shared disk file system running on multiple computers. More specifically, the present invention relates to a method for enforcing resource utilization within a predetermined limit in the distributed computer system.

BACKGROUND OF THE INVENTION

A distributed processing system comprises a shared disk file system operating on more than one computer. Each of the computers (or clients) in the distributed processing system comprises an instance of an operating system. Each of the clients is coupled for parallel data-sharing access to files residing on storage in the form of network attached disks or storage servers. A user in the form of a human or an application accesses the storage through one or more clients.

A distributed processing system (also referred to as a storage system) manages the resources contained by the storage system to provide adequate service to applications and clients. Many storage systems have mechanisms that ensure that applications or clients acting on behalf of the application receive the performance that the application needs to perform properly. Placing an upper bound on performance ensures that one application cannot use all the resource in the storage system and cause unacceptable performance degradation for other applications.

Conventional methods of enforcing an upper bound on performance comprise associating performance limits with data items or using sessions between an application and a storage device in the storage system. In associating performance limits with data items, the storage system records that a particular data item has a performance limit. The data item can be, for example, an object, a partition, a logical unit number (LUN), a file, etc. The performance limit is applied to all accesses to the item, regardless of the application or client issuing a request. When using sessions, the application or client negotiates a session comprising performance limits with the storage device. The session is often related to a network transport connection. A maximum service level is associated with the session and the negotiated performance limits are applied to all IO requests issued in the context of the session, regardless of the data item.

These conventional methods provide local enforcement of a maximum service level at a storage device; no other component is involved in the request-by-request decisions that are made. The mechanisms of these conventional methods can further be built such that clients or applications cannot subvert the mechanisms even if the clients or applications misbehave. Although these conventional methods have proven to be useful, it would be desirable to present additional improvements.

In a distributed storage system, management of resources becomes difficult. Resource management of storage units or storage servers in a distributed storage system can be centralized in a central management server. However, the resulting processing load on the central management server imposes a limit on performance of the distributed storage system and further limits the largest scale the distributed storage system can achieve.

Otherwise, resource management can be decentralized such that, for example, each of the storage servers in the distributed storage system manages resources individually. With decentralized resource management, performance of the distributed storage system can scale with the size of the distributed storage system. However, consistent global policies are difficult to ensure in a distributed storage system with decentralized resource management.

Furthermore, performance requirements of a centralized storage system may vary depending on the usage of the centralized storage system. In some environments, the centralized storage system may be required to guarantee a minimum level of service or quality of service. For example, users of business applications expect at most a particular response time or at least a certain transaction throughput. In other environments, the centralized storage system may be required to limit an amount of resources consumed by an application or a user. For example, users in scientific or departmental computing share storage with no one user allowed to consume more than a predetermined share. Some applications are only concerned with storage capacity; other applications require control over performance as well.

Conventional file systems, including distributed file systems, often provide capacity quotas that impose a maximum capacity usage on any one user. However, these file systems do not guarantee to a user a minimum amount of capacity. Further, file systems usually do not consider performance-oriented resources.

Conventional distributed logical volume managers and storage virtualization engines provide aggregation of capacity from multiple storage devices into one logical volume. This aggregation of capacity provides guaranteed capacity to a user without allowing for large-scale over-commitment of capacity in the manner of file systems.

Some conventional virtualization engines support IO throttling mechanisms that try to ensure a given level of performance for an application. However, these virtualization engines do not reserve resources for an application even when that application is not active. Reservation of resources is required so that when an application tries to create an IO session with a particular performance level, the admission of the session can be guaranteed.

Conventional file systems, volume managers, and storage virtualization engines do not distribute resource control work to the storage devices. These conventional approaches all use passive storage devices that only read and write data blocks from one to another. Furthermore, conventional systems open a session by opening a connection to a specific server, limiting the session to one server. To migrate to a new server, the conventional approach requires closing a current session and opening a new session. While migrating to a new server, conventional approaches may be required to wait until sufficient resources become available for the migrating session.

Some conventional distributed storage systems aggregate multiple object storage devices into a logical object storage device. The object storage devices in this approach comprise some local intelligence and make local resource allocation decisions such as determining which blocks should hold the data of an object. Although this technology has proven to be useful, it would be desirable to present additional improvements. This conventional system enforces maximum limits in the form of quotas on storage capacity. The object storage device can maintain quotas on partitions; these quotas on partitions can be used to build distributed enforcement of quota across multiple storage devices by ensuring that a sum of the quotas on partitions is no larger than the allowed distributed quota.

Conventional sessions in a virtual resource pool provide fine-grained inter-application isolation. However, these sessions are typically negotiated between one client and the storage device; a conventional virtual resource pool manager does not have an opportunity to effect policies that involve multiple storage devices.

What is therefore needed is a system, a service, a computer program product, and an associated method for managing resources in a distributed storage system that allows a virtual resource pool manager to determine service levels for applications while ensuring that applications that share a data item are isolated in performance from each other. Furthermore, by having a virtual resource pool manager determine a service level, the sum of all service levels for a client, application, or user can be compared to an overall performance limit. Also needed is a solution that allows a variety of performance levels within one session while maintaining performance isolation. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for managing resources in a distributed storage system. While the present invention is described for illustration purposes only in terms of an object storage system, it should be clear that the present invention is applicable as well to, for example, any type of storage system. Furthermore, while the present invention is described in terms of quality of service, the features of the present invention also apply to performance isolation.

The present system comprises a virtual resource pool spread across one or more storage devices. The virtual resource pool is a virtual pool of some resource such as, for example, data storage. Each of the one or more storage devices dedicates a selection of a resource such as, for example, data storage on a disk, or performance to the virtual resource pool. Applications can create a virtual object in the virtual resource pool, read data in the virtual object, and write data in the virtual object. Each virtual object typically consumes some resource in the virtual resource pool such as, for example, storage, IO rate, or bandwidth, etc., while the use of the virtual object consumes performance. The virtual resource pool is a virtual storage server in which an application receives at least a predetermined amount of storage capacity, a predetermined level of performance, or a predetermined reliability.

Each virtual resource pool uses a set of tokens that represent resource attributes. Each token comprises a byte string. A token represents a right to consume a minimum guaranteed amount and maximum limit on one or more resources. A guaranteed minimum for a specified resource ensures that at least a certain minimum amount of the specified resource is available to an application. As an example, a token for storage capacity represents a predetermined amount of data storage capacity.

A virtual resource pool manager of the present system gives the token to an application, client, or a user (generally referenced herein as a client). The token is transmitted with any request made by the client to the storage device. For example, each time the client transmits an IO request to a storage device, the token is transmitted with the IO request. The token represents a right to consume up to some limit of resources on a specific storage device in a computing session (further referenced herein as a session). A token for storage capacity guarantees a client that at least that much capacity can be used storing data. For performance-oriented resources, such as IO rate and bandwidth, a token guarantees that any client that offers a load at least as high as the predetermined value of the token observes at least the guaranteed throughput.

The reservation value of the token can be zero, meaning that the reservation provides no guarantees about availability of that resource for the virtual resource pool. A limit value of the token places a limit on the amount of resource that can be used. A token for storage capacity acts as a file system quota, ensuring that any one virtual resource pool uses no more than a given amount of space. A token representing a throughput resource that comprises a maximum limit ensures that an application receives no more than the maximum limit, no matter how much the application requests. The maximum limit can be unlimited, meaning the present system allows an activity by an application in the virtual resource pool to consume as much resource as is available.

Each token represents resources on a storage device, one token per storage device. Each token comprises a storage device ID. The token comprises a performance level associated with a session. The token further comprises, for example, an expiry, a nonce, a digital signature, an authenticator, or any other technique to ensure that the token cannot be forged, altered, or snooped on the wire and reused. The authenticator comprises one or more fields in the token that make the token unique and non-forgeable. Any other protection mechanism can be used by the present invention to protect the token from misuse. The token comprises an entity, identifying what entity within a storage device is referenced by the token. In object storage, the entity can be an object, a partition, or an allocation pool. In block storage, the entity can be a block, a range of blocks, a partition, a logical unit, or a logical volume.

In one embodiment, a token for object storage further comprises limitations on which storage objects an application can use. In another embodiment, a token for block storage further comprises limitations on which blocks or logical unit numbers (LUNs) an application can use.

A virtual resource pool is constructed as the aggregation of a set of local allocation pools on one or more storage devices with one local allocation pool per storage device. The selection and location of the local allocation pools is transparent to an application using the virtual resource pool. Each allocation pool comprises a specification of the minimum and maximum resources that the local allocation pool can consume on a corresponding storage device. Each local allocation pool further comprises a measure of current resource usage of the local allocation pool on the corresponding storage device.

The allocation pools provide local enforcement of the virtual resource allocation policy of the virtual resource pool. An allocation pool monitors consumption of resources by an application via one or more tokens. The virtual resource pool monitors overall consumption of resources by an application by summing attributes represented by the tokens. An application is guaranteed performance represented by one or more tokens assigned to the application as long as the attributes on the virtual resource pool match the sum of the attributes on the associated local allocation pools. Furthermore, the overall amount of resources that an application is guaranteed is limited to match the virtual specification represented by one or more tokens assigned to the application.

By having the storage devices track and enforce the detailed resource policy, resource management can scale with the size of a distributed storage system rather than bottlenecking on central policy management. The present system assumes that the distributed storage system comprise intelligence that can perform local policy management.

The local allocation pools that make up a virtual resource pool do not all need to be similar. Local allocation pools can be individually sized to match the amount of available resource on each storage device. Furthermore, the size of each local allocation pool can be changed over time. The set of local allocation pools in the virtual resource pool can change. For example, migrating data from one storage device to another to balance the load adds a local allocation pool on an additional storage device to the virtual resource pool.

In general, requirements of the virtual resource pool provide a specification of the intent of resource allocation in the distributed storage system. The present system moves settings of the local allocation pool towards those requirements. The local allocation pools need not sum up to the resource requirements of the virtual resource pool if the present system can ensure the guarantees or limits some other way. For example, the sum of the guarantees of the local allocation pool may be less than the guarantee of the virtual resource pool if the present system has set aside enough resource in general to match the guarantee. When the performance of the virtual resource pool exceeds some limit, a local allocation pool on another device is created. The local allocation pools can also provide more resource than the virtual resource pool allows for a short time (i.e., while migrating data) provided the management system ensures that the limits are met some other way. For example, storage limits can be met by not allocating new space in local allocation pools of storage devices from which data is being migrated.

The present system handles storage capacity and other resources such as, for example, IO rate and bandwidth. Furthermore, the present system provides guarantees and limits. Consequently, file system quotas and application guarantees can be provided by the present system. The present system manages varying resource availability and change in resource limits by using dynamic and variable allocation pools.

The present system allows a virtual resource pool manager to determine service levels for applications while ensuring that applications that share a data item are isolated in performance from each other. The performance limits for the application are summed across all storage devices in the virtual resource pool to match the performance limits on the virtual resource pool.

The present system allows an application to comprise components on one or more clients; consequently, the application is isolated from other applications. More than one client can share a service level. This feature of the present system is useful when applications migrate from one host to another in a cluster or when two or more nodes in a cluster are cooperating on an out-of-core core computation that requires isolation from other applications running on the cluster.

The present system allows two or more applications running on a single client to obtain separate service levels. The present system further allows a storage device to forget about a state of inactive sessions. This feature of the present system minimizes an amount of memory required for performance management and avoids explicit clean up after a client failure.

The client or application negotiates with a virtual resource pool manager of the present system to obtain a token, thus opening a session with the virtual resource pool. The session comprises a sub-session in the allocation pool on each of the storage devices assigned to the session. The application appends the token to each request or command transmitted to a storage device in the context of the session; the token is chosen to match the specific storage device used. When the storage device receives a request with a token, the storage device examines a cache of tokens and recent performance associated with those tokens. The storage device does not track the origin of the token; rather, the storage device tracks the performance of the commands associated with the token.

If the token is new to the cache, the storage device adds the token to the cache with zeroed performance statistics. If the token is not new to the cache, the storage device updates in the cache performance statistics associated with the token. The request is admitted to the storage device if execution of the request does not cause the recent performance to exceed performance limits associated with the token. Otherwise, the request is placed in a queue and executed when allowed by performance limits. The storage device can delete any entries in the cache when recent performance for that entry has dropped to zero or some predetermined threshold. The storage device can further delete any entries that have expired according to the expiry of the token. Allowing the storage device to delete inactive entries or expired entries in the cache eliminates a need for explicitly closing a session.

A virtual resource pool manager of the present system issues the tokens while ensuring local enforcement of performance limits. Two or more applications can be isolated from each other regardless of where the applications are running. Applications sharing a data item can each receive different tokens for that data item, thus ensuring mutual isolation.

Any two or more applications can share a session by using the same token. Because the token is included with requests from an application, the storage device need only monitor of the performance associated with each token provided that recent performance usage is associated with the token. Otherwise, the storage device can delete any record associated with a session. If a client crashes or decides to stop using a session, the storage device automatically cleans up the entries in the cache associated with that session without any explicit instruction.

The present system is faster to set up than a conventional approach because a physical network connection is not required for setting up the local allocation pools. The present system does not require communication with the storage servers or connection negotiation with the storage servers.

The present system requires few kernel resources at a central server where the virtual resource pool manager operates. In contrast, each network connection in a conventional system requires maintenance of an entry in the network connection table in the kernel. The present system is not tied to a single client; rather, the present system can manage resource for a distributed system comprising additional clients and storage servers.

The present invention may be embodied in a utility program such as a resource management utility program. The present invention also provides means for the user to identify a set of resources requiring management and specifying required limits or guarantees for the set of resources. The present system provides means for the user to invoke the resource management utility program to manage the specified resources on a distributed storage network. The set of resources comprise storage, IO rate, bandwidth, etc. The limits or guarantees comprise an upper bound on performance, a guaranteed quality of service, a minimum bound on performance, reliability, etc.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 6 comprises

DETAILED DESCRIPTION OF PREFERRED EMBODIMENTS

Figure 1:
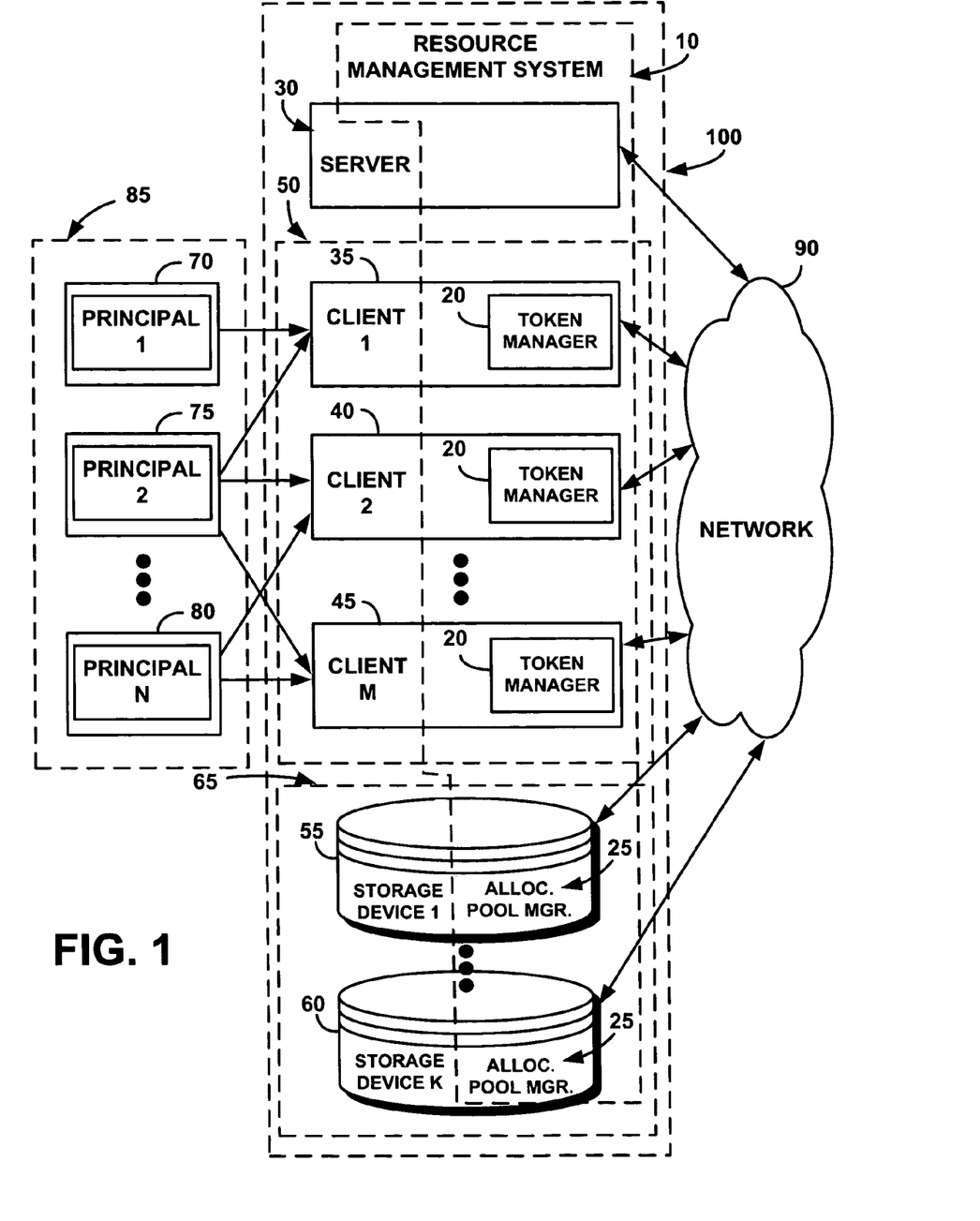
FIG. 1 is a schematic illustration of an exemplary operating environment in which a resource management system of the present invention can be used.

FIG. 1 portrays an exemplary overall environment in which a system, a service, a computer program product, and an associated method (the resource management system IO or "the system 10") for enforcing resource utilization in a distributed system (a distributed storage system 100) according to the present invention may be used. System 10 comprises a virtual resource pool manager 15, a token manager 20, and an allocation pool manager 25.

System 10 includes a software programming code or computer program product that is typically embedded within or installed on a computer. The virtual resource pool manager 15 is embedded within or installed on a server 30. The token manager 20 is embedded within or installed on a computer functioning as a client server (also known as a client) such as, for example, a client 1, 35, a client 2, 40, through a client M, 45 (collectively referenced herein as clients 50).

The allocation pool manager 25 is embedded within or installed on a storage device such as, for example, a storage device 1, 55, through a storage device K, 60 (collectively referenced herein as storage devices 65). One or more of the storage devices 65 may be, for example, storage servers. All or portions of system 10 could be saved on a suitable computer-readable medium.

Users such as, for example, humans or applications, are represented by a principal 1, 70, a principal 2, 75, through a principal N, 80 (collectively referenced herein as principals 85). Each of the principals 85 accesses one or more of the storage devices 65 via one or more of the clients 50. One or more of the clients 50 can act on behalf of one of the principals 85. One or more of the principals 85 can use one of the clients 50. For example, in the exemplary illustration of FIG. 1, principal 1, 70, accesses client 1, 35; principal 2, 75, accesses client 2, 40 and client M, 45; and principal N, 80, accesses client 2, 40, and client M, 45. Clients 50 access the storage devices 65 on behalf of principals 85 via a network 90. While the system 10 will be described in connection with a distributed network such as network 90, the system 10 can be used with a local network or a stand-alone computer.

Figure 2:
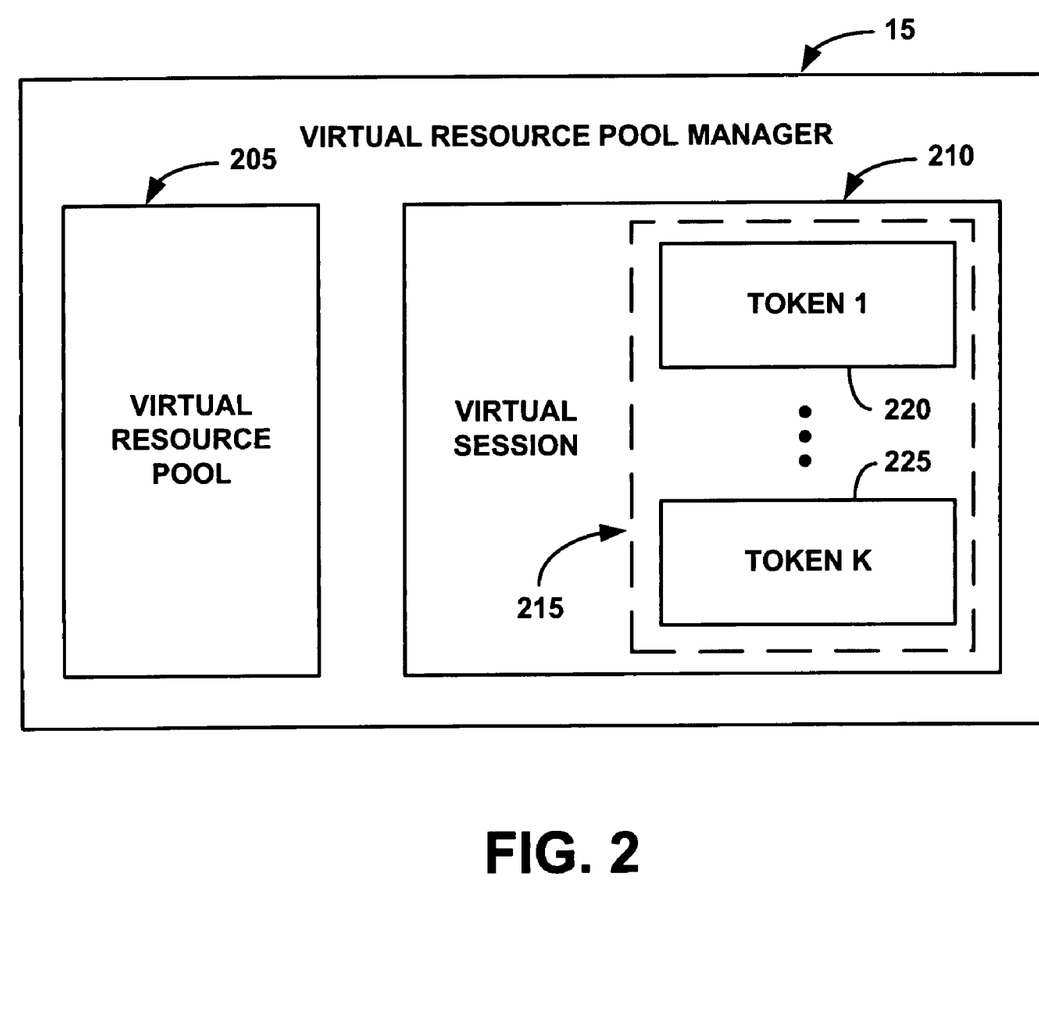
FIG. 2 is a block diagram of the high-level architecture of a virtual resource pool manager of the resource management system of FIG. 1.

FIG. 2 illustrates a high-level hierarchy of the virtual resource pool manager 15. In response to a request from any of the clients 35 (for example, client 1, 35), the virtual resource pool manager 15 generates a virtual resource pool 205. The virtual resource pool 205 comprises a record in the virtual resource pool manager 15. The record comprises, for each resource, a minimum reservation amount, a maximum limit amount, and a set of allocation pools on the storage devices 65 that provide storage for the virtual resource pool. The virtual resource pool 205 further comprises specifications for the expected reliability of the data stored in the virtual resource pool 205. Based on the reliability and performance requirements negotiated with the client 1, 35, the virtual resource pool manager 15 determines how many allocation pools are required to support the virtual resource pool 205. The allocation pools are spread across one or more of the storage devices 65, depending on resource availability in the storage devices 65.

When one of the principals 85 initiates a session with the distributed storage system 100, the virtual resource pool manager 15 generates a virtual session 210. The virtual session 210 generates a set of tokens 215 (further referenced herein as tokens 215) representing resource capabilities within the virtual resource pool. The set of tokens 215 comprises token 1, 220 through token K, 225, with one token generated for each of the storage devices 65 comprising an allocation pool in the virtual resource pool 205.

Figure 3:
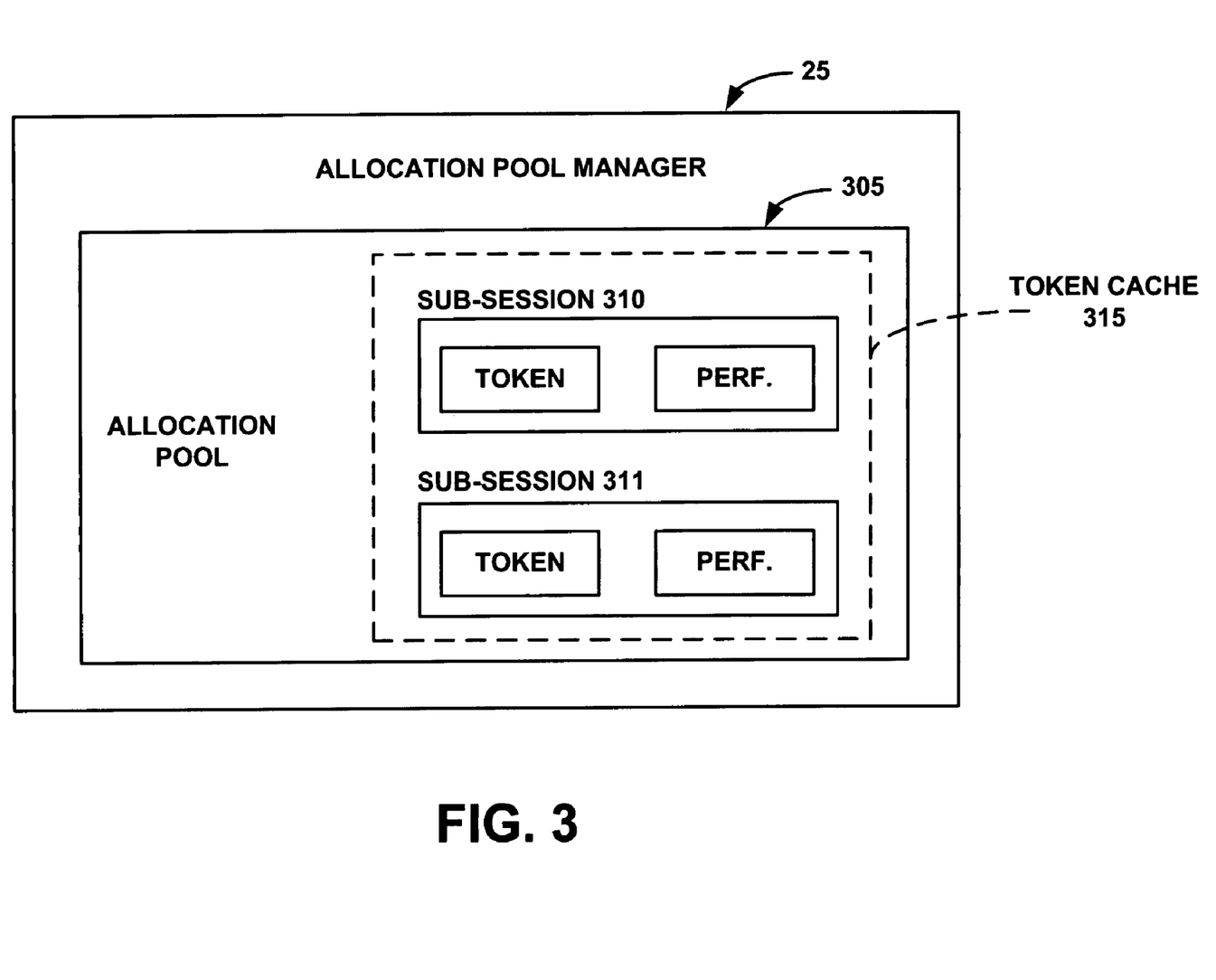
FIG. 3 is a block diagram of the high-level architecture of an allocation pool manager of the resource management system of FIG. 1.

FIG. 3 illustrates a high-level hierarchy of the allocation pool manager 25. The allocation pool manager 25 manages an allocation pool 305. The allocation pool 305 comprises, for illustration purpose only, sub-sessions 310, 311 that form part of a token cache 315. The token cache 315 is a table comprising each of the tokens 215 that the allocation pool manager 25 has recently seen and corresponding performance accorded to the recently seen token. The allocation pool manager 25 maintains information in the token cache 315 regarding available resources of the storage device (i.e., storage device 1, 55) on which the allocation pool manager 25 is installed. The available resources are tracked (or compared) using, for each resource, the amount of unused resource and the maximum amount available of that resource. The allocation pool 305 on a specific one of the storage devices 65 comprises, for each resource, a minimum guaranteed amount of resource, a maximum limit amount for the resource, a current usage of the resource, and the virtual resource pool 205 that corresponds to the allocation pool 305.

The virtual resource pool manager 15 generates a virtual resource pool 205 as required or for each application. Additional versions of the virtual resource pool 205 for the same application or for other applications may be operating at any one time. To illustrate performance of system 10, the following description uses principal 1, 70, to represent principals 85 in general.

Figure 4:
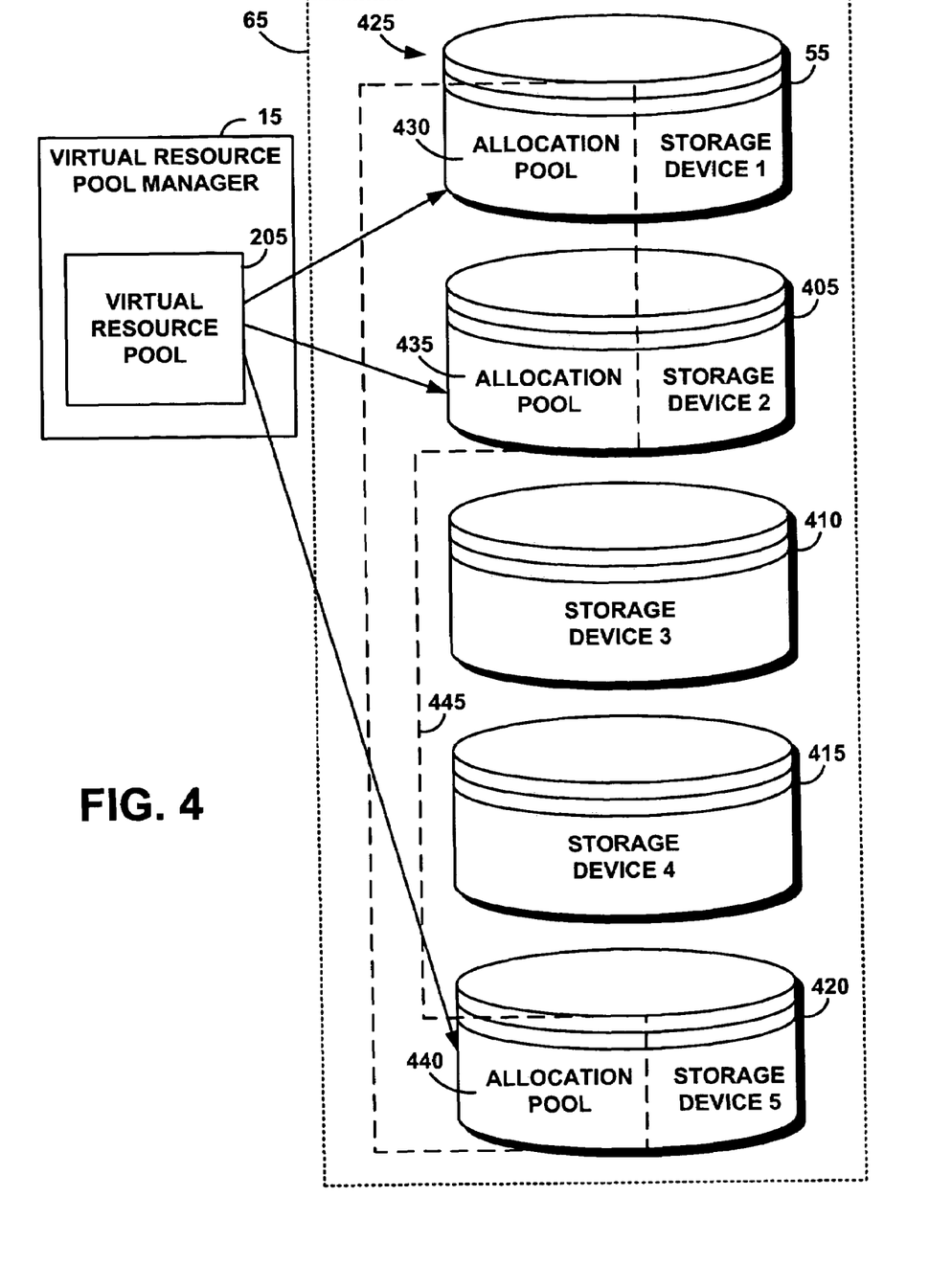
FIG. 4 is a block diagram of an exemplary resource management system of FIG. 1 with a set of storage devices in which some of the storage devices comprise an allocation pool.

FIG. 4 illustrates an exemplary distribution of the virtual resource pool 205 over selected storage devices in the storage devices 65. For illustration purposes only, the storage devices 65 comprise storage device 1, 55, storage device 2, 405, storage device 3, 410, storage device 4, 415, and storage device 5, 420. To generate a virtual resource pool 205, the virtual resource pool manager 15 analyzes reliability and performance requirements to meet negotiated or otherwise predetermined performance requirements for principal 1, 70. From this analysis, the virtual resource pool manager 15 determines how many of the allocation pool 305 are required to support the virtual resource pool 205. The virtual resource pool manager 15 examines the storage devices 65 to determine which of the storage devices 65 have sufficient unused resources to support the allocation pool 305. The virtual resource pool manager 15 may select some or all of the storage devices 65, as many as required to support the performance requirements for principal 1, 70. One allocation pool 305 is assigned to each of the selected storage devices 65.

The virtual resource pool manager 15 selects, for example, the storage device 1, 55, the storage device 2, 405, and the storage device 5, 420 (collectively referred to as the selected storage devices 425) to support the virtual resource pool 205. The virtual resource pool manager 15 further divides the performance requirements of the virtual resource pool 205 among the selected storage devices 425, assigning a storage allocation pool 305 to each of the selected storage devices 425. In the example of FIG. 4, the storage device 1, 55 receives an allocation pool 430, the storage device 2, 405, receives an allocation pool 435, and the storage device 5, 420, receives an allocation pool 440. The allocation pool 430, the allocation pool 435, and the allocation pool 440 are collectively referred to as allocation pools 445.

The division of the performance requirements of the virtual resource pool 205 among the selected storage devices 425 is performed such that each of the allocation pools 445 match the resources available on the corresponding selected storage devices 425. The virtual resource pool manager 15 further sizes the allocation pools 445 such that a sum of the resource attributes of the allocation pools 445 is equivalent to the performance requirements of the virtual resource pool 205. The virtual resource pool manager 15 creates a record for the virtual resource pool 205.

The virtual resource pool manager 15 can change the performance requirements of the virtual resource pool 205 by adding an allocation pool to or removing an allocation pool from the allocation pools 445. The virtual resource pool manager 15 can further change the performance requirements of the virtual resource pool 205 by changing the performance requirements of one, some, or all of the allocation pools 445. The virtual resource pool manager 15 changes the record for the virtual resource pool 205 to reflect any change in the allocation pools 445.

The allocation pool manager 25 on each of the selected storage devices 425 generates an allocation pool record from specifications provided by the virtual resource pool manager 15. For example, on storage device 1, 55, for each resource, the allocation pool manager 25 on the storage device 1, 55, sets the current usage of the allocation pool 430 to zero. The allocation pool manager 25 further decreases an amount of unused resource on the storage device 1, 55, by the minimum guaranteed amount of the allocation pool 430. If the storage device 1, 55, does not have sufficient unused resources for generation of the allocation pool 430, generation of the allocation pool 430 fails. Failure of a generation of an allocation pool has no effect on performance of the associated storage device or on the virtual resource pool 205.

The virtual resource pool manager 15 can change the performance requirements of an allocation pool such as, for example, allocation pool 430. For each resource, the virtual resource pool manager 15 determines a desired change in resource consumption on the storage device associated with the allocation pool; i.e., the storage device 1, 55, associated with the allocation pool 430. The virtual resource pool manager 15 changes the unused resource of the storage device 1, 55, by the determined value of change in resource consumption. The virtual resource pool manager 15 changes the record for the virtual resource pool 205 to reflect the change in the allocation pool 430. If a storage device has insufficient resources to support a change by the virtual resource pool manager 15, the change in performance requirements of the allocation pool fails.

On releasing a resource (e.g. when truncating or deleting a data object), for each resource, if a current usage is greater than a minimum guarantee, the virtual resource pool manager 205 increments the unused resource of a storage device by min(released amount, current usage-minimum guarantee). The virtual resource pool manager 25 decreases the current usage in the record of the corresponding allocation pool 305.

Figure 5:
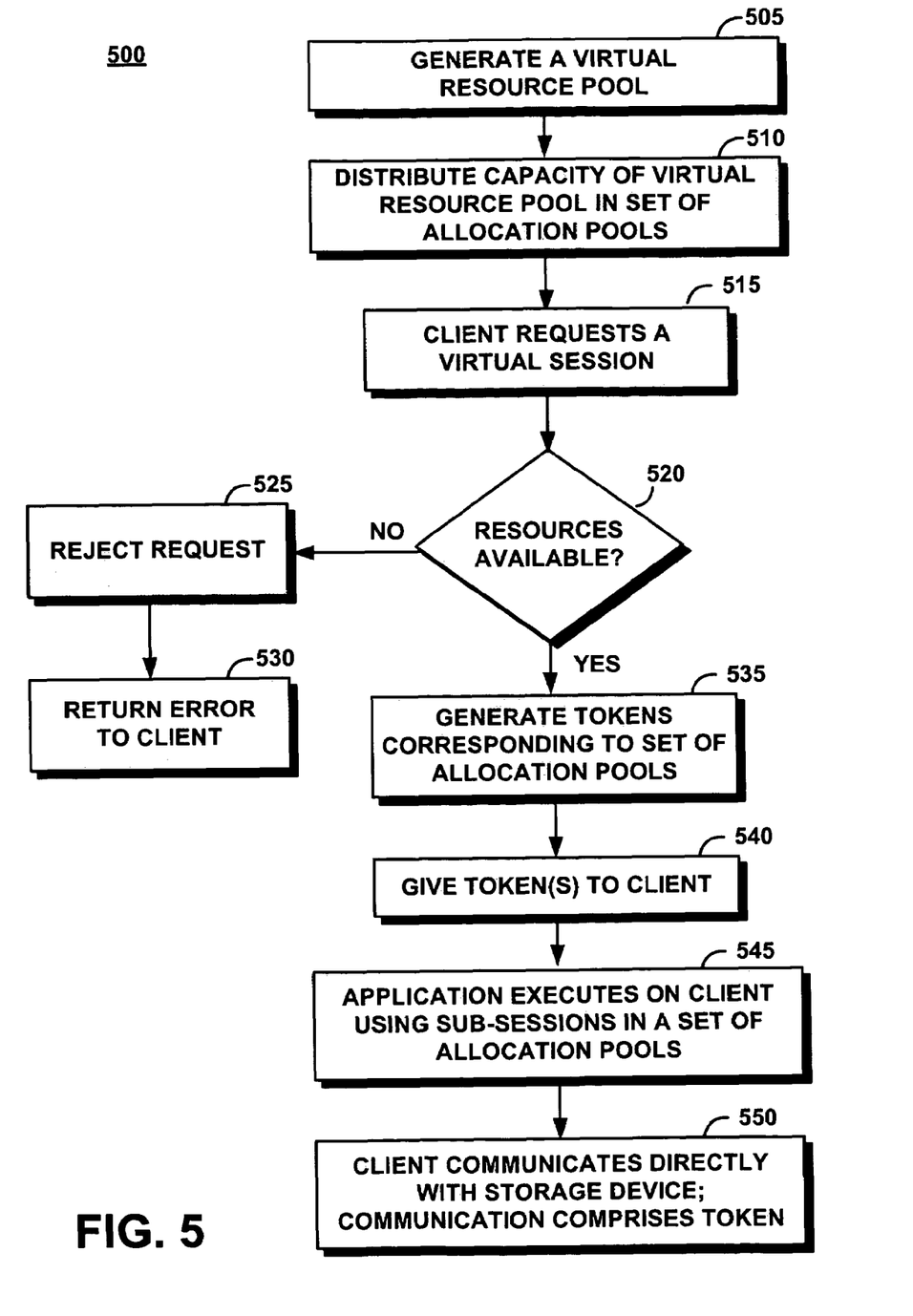
FIG. 5 is a process flow chart illustrating a method of operation of the resource management system of FIG. 1 in generating a virtual resource pool and associated allocation pools.

FIG. 5 illustrates a method 500 of system 10 in initiating a session on the virtual resource pool 205 to use the resources of the virtual resource pool 205. The virtual resource pool manager 15 generates the virtual resource pool 205 (step 505). The virtual resource pool manager 15 dynamically or statically distributes a resource capacity of the virtual resource pool 205 over a set of allocation pools (step 510); each allocation pool in the set of allocation pools resides on one of the storage devices 65.

A client such as, for example, client 1, 35, requests a virtual session with the virtual resource pool 205 (step 515). The virtual resource pool manager 15 determines whether resources are available for the session (decision step 520). If resources are not available, the virtual resource pool manager 15 rejects the request for a session (step 525). The virtual resource pool manager 15 returns an error to the client 1, 35, (step 530), notifying the client 1, 35, that sufficient resources are unavailable.

If sufficient resources are available for the session (decision step 520), the virtual resource pool manager 15 generates a set of tokens 215 corresponding to a set of allocation pools on the storage devices 65 (step 535). FIG. 4 illustrates an exemplary set of allocation pools 445. One token is generated for each of the allocation pools 445 on the storage devices 65.

The virtual resource pool manager 15 gives the set of tokens 215 to the client 1, 35 (step 540). An application executes on the client 1, 35, using sub-session 310 in each of the allocation pools 445 (step 545). The client 1, 35, communicates directly with each of the storage devices 65 comprising one of the allocation pools 445 (step 550): each communication comprises one of the tokens 215; each of the tokens 215 can be used more than once.

Figure 6A:
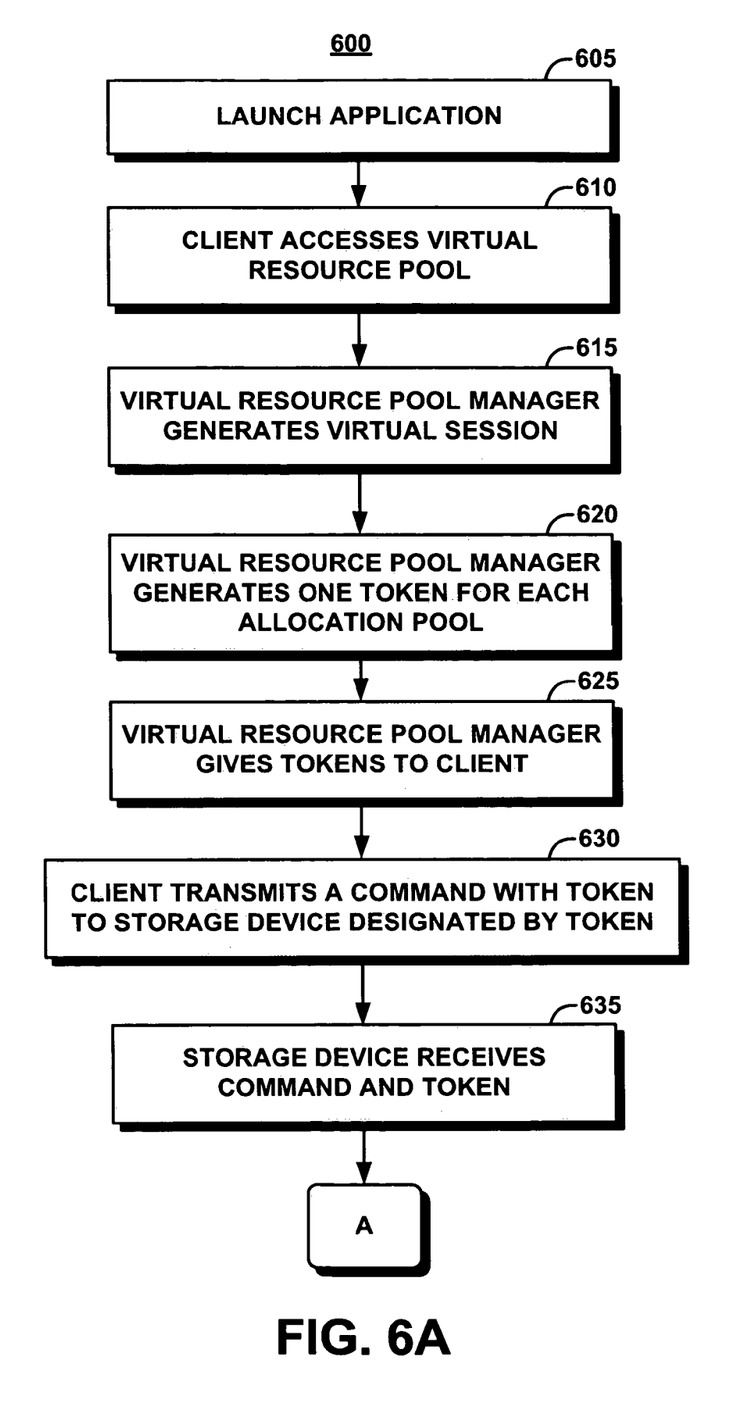
FIGS. 6A and 6B is a process flow chart illustrating a method of operation of the resource management system of FIG. 1 in managing a resource through a token transmitted with a command.
Figure 6B:
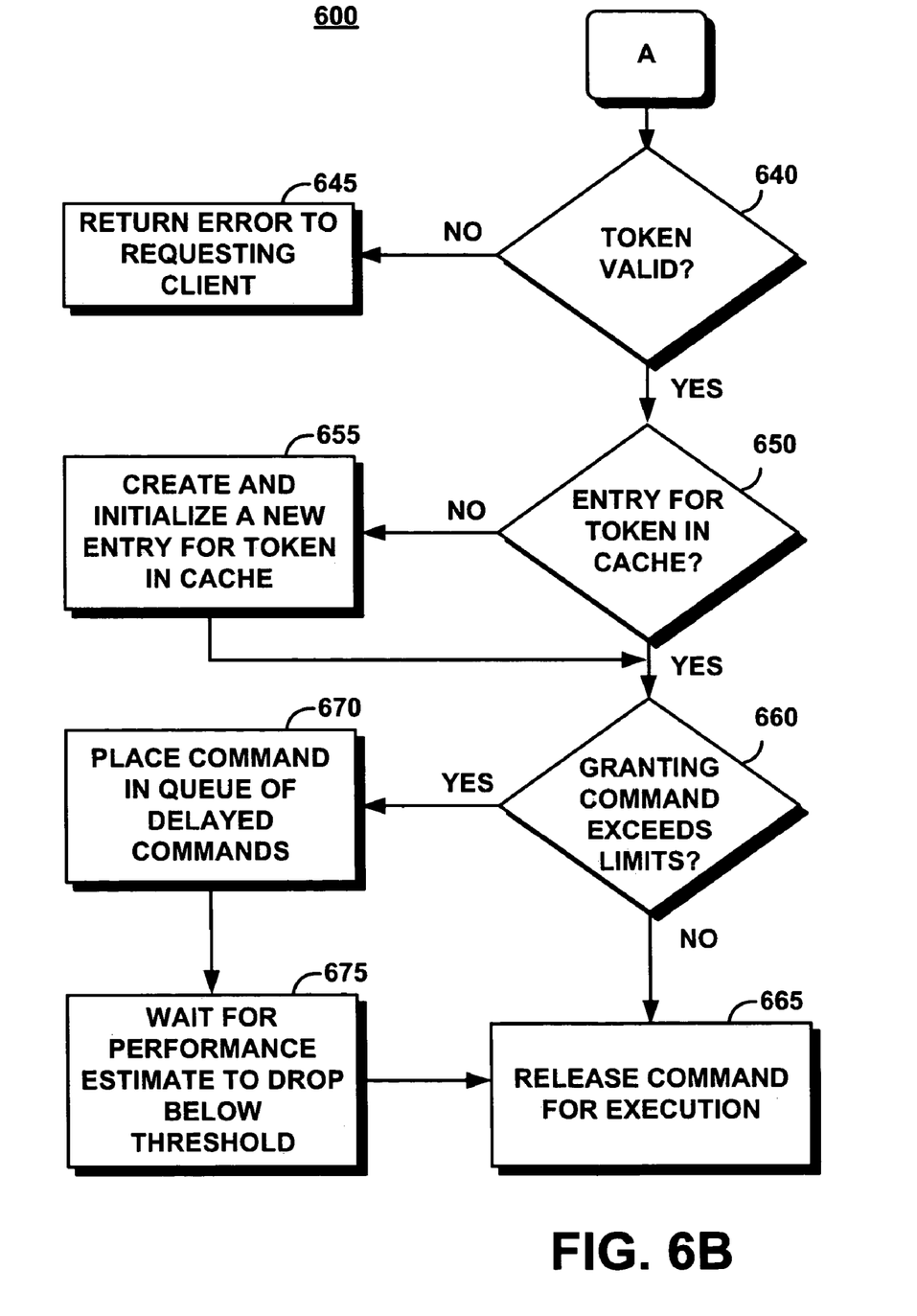

FIG. 6 (FIGS. 6A, 6B) illustrates a method 600 showing in more detail management of resources by system 10. Any of the principals 85 launches an application (step 605) on any of the clients such as, for example, client 1, 35. Client 1, 35, accesses the virtual resource pool 205 (step 610). The virtual resource pool manager 15 generates the virtual session 210 (step 615). For the virtual session, the virtual resource pool manager 15 generates the set of tokens 215 by generating one token for each allocation pool 305 associated with the virtual resource pool 205 (step 620).

The virtual resource pool manager 15 gives the set of tokens 215 to the client 1, 35 (step 625). The client 1, 35, transmits a command such as, for example, an IO command, with one of the tokens 215 to one of the storage devices 65 as specified by the selected token (step 630). For illustration purposes, the token manager 20 on the client 1, 35, transmits the command with token 1, 220. In this example, token 1, 220, comprises performance limits and guarantees for the allocation pool 430 on the storage device 1, 55. The storage device 1, 55, receives the command and the transmitted token, token 1, 220 (step 635).

The allocation pool manager 25 on the storage device 1, 55, determines whether the transmitted token, token 1, 220, is valid (decision step 640). If the token 1, 220, is not valid, the allocation pool manager 25 returns an error to the requesting client (step 645) that is, in this example, client 1, 35. A token can be found invalid if the token has expired or if the authentication is invalid. On the storage device 1, 55, the allocation pool manager 25 examines the token cache 315 to determine whether the token 1, 220, has an entry in the token cache 315 (decision step 650). If not, the allocation pool manager 25 creates and initializes a new entry in the token cache 315 for the token 1, 220.

Table 1 illustrates and exemplary table of the token cache 315. The table comprises a column for a token, identifying the token. The table further comprises a column of an estimated recent performance provided by the storage device for the token. The table comprises a column indicating a queue of I/O requests that are waiting for resources to become available. The allocation pool manager 25 regularly updates the token cache 315. As resources become available, requests (or commands) in the queue are removed from the queue and performed.

TABLE 1

An exemplary table of the token cache 315.

| Token | Estimated recent performance | Queue |
|---|---|---|
| ... | ... | ... |
| <server 1, 10 MB/s, expires 13:40, xyz> | 9.5 MB/s | <read 512 bytes @10245> |
| ... | ... | ... |
| <server Q, 100 MB/s, expires 19:33, xyz> | 6.2 MB/s | <write 128 bytes @10245> |
| ... | ... | ... |

The allocation pool manager 25 determines whether granting the transmitted command exceeds limits of the token (i.e., token 1, 220) that accompanied the command (decision step 660). On using a resource, for each resource, the virtual resource pool manager 15 ensures that the current usage plus the amount of resources required by this command are below the maximum limit indicated by the corresponding token. The virtual resource pool manager 25 allocates new resource from the storage device if needed: if (current usage+request amount)>minimum guarantee, decrease unused resource on the storage device by (current usage+request amount)−max (current usage, minimum guarantee). The virtual resource pool manger 15 then updates the current usage in the record of the corresponding allocation pool 305.

If, at decision step 660, granting the command does not exceed the limits of token 1, 220, the allocation pool manager 25 releases the command for execution (step 665). In the case where a new entry is created for the token (step 655), the command is granted because no performance is associated with the command.

If, at decision step 660, granting the command exceeds the limits of token 1, 220, the allocation pool manager 25 places the command in the queue of delayed commands in the table of the token cache 315 (step 670). The allocation pool manager 25 waits for the performance estimate of the command associated with token 1, 220, to drop below a predetermined threshold (step 675). The allocation pool manager then releases the command for execution when the performance estimate for the command associated with token 1, 220, is less than the predetermined threshold (step 665).

It is to be understood that the specific embodiments of the invention that have been described are merely illustrative of certain applications of the principle of the present invention. Numerous modifications may be made to the system, method, and service for managing resources in a distributed storage system described herein without departing from the spirit and scope of the present invention.

What is claimed is:

1. A method of managing a resource in a distributed storage system having a plurality of storage devices, comprising:
   generating a virtual pool of resources;
   distributing the resources among a set of allocation pools on the storage devices;
   where each allocation pool comprises:
      a specification of minimum and maximum resources that the allocation pool can consume; and
      a measure of current resource usage of the allocation pool;
   examining a request for resources by an application to determine availability of requested resources within the set of allocation pools;
   if the requested resources are available, then generating a virtual session in response to the request;
   generating a set of tokens corresponding to the set of allocation pools, where each token represents a right to consume a minimum guaranteed amount and a maximum limit for a specific resource;
   sending the set of tokens to the application for selective transmission to the storage device with a command;
   maintaining, at each of the storage devices, a cache entry of the tokens that were recently sent to said storage devices; and
   tracking the token in a token cache to monitor and limit consumption of the resources in the storage devices.

2. The method of claim 1, wherein each of the storage devices monitors resource usage associated with each of the tokens.

3. The method of claim 2, wherein if no client sends a command on the virtual session, determining that recent usage dropped below a predetermined threshold, and removing the cache entry associated with the virtual session.

4. The method of claim 3, wherein the tokens carry an indication of the performance expected on the virtual session and the storage devices use, for determining a level of performance to provide to an application.

5. The method of claim 2, wherein the tokens comprise expiration and authentication information to prevent improper copying of the tokens, and to ensure that only an authorized resource management system is capable of generating the tokens.

6. The method of claim 3, wherein a first client sharing tokens with a second client to share the virtual session so that the first and second clients are capable of sharing the virtual session.

7. A computer program product comprising:
   one or more computer-readable storage media having stored computer-executable instructions for implementing a method for providing any of a minimum level of performance or a maximum level of performance, to an application in a distributed storage architecture for a plurality of storage devices, said method comprising:
      managing resource capabilities represented by a plurality of tokens via a resource management system;
   where each token from the plurality of tokens represents a right to consume a minimum guaranteed amount and a maximum limit for a specific resource;
   negotiating between the application and the resource management system with regard to the application obtaining at least some of the tokens;
   generating a virtual pool of resources for distributing the tokens to the application;
   comparing the tokens against a minimum performance utilization of recently-seen tokens and determining whether there are sufficient resources available to accept the tokens, wherein each of the storage devices maintains a cache entry of the tokens that were recently sent to said storage devices;

adding an allocation pool to the pool of resource when sufficient resources are not available in the pool of resources; and opening a session between the application and the storage devices upon determining there are sufficient resources available to accept the tokens.

8. The system product of claim 7, wherein each of the storage devices monitors resource usage associated with each of the tokens.

9. The product of claim 8, wherein if no client sends a command on the virtual session, the allocation pool manager determines that recent usage dropped below a predetermined threshold, and removing the cache entry associated with the virtual session.

10. The system product of claim 9, wherein the tokens carry an indication of the performance expected on the virtual session and the storage devices use, for determining a level of performance to provide to an application.

11. The product of claim 8, wherein the tokens comprise expiration and authentication information to prevent improper copying of the tokens, and to ensure that only an authorized resource management system is capable of generating the tokens.

12. The system product of claim 9, wherein a first client sharing tokens with a second client to share the virtual session so that the first and second clients are capable of sharing the virtual session.

13. A computer program product having a plurality of executable instruction codes that are stored on a computer-readable medium, for managing a resource in a distributed storage system having a plurality of storage devices, comprising:

a first set of instruction codes for generating a virtual pool of resources;

a second set of instruction codes for distributing the resources among a set of allocation pools on the storage devices;

where each allocation pool comprises:
  a specification of minimum and maximum resources that the allocation pool can consume; and
  a measure of current resource usage of the allocation pool;

a third set of instruction codes for examining a request for resources by an application to determine availability of requested resources within the set of allocation pools;

a fourth set of instruction codes for generating a virtual session in response to a request for resources by an application if the requested resources are available;

a fifth set of instruction codes for generating a set of tokens representing the resources in the allocation pools;

a sixth set of instruction codes for sending the set of tokens to the application for selective transmission to the storage device with a command, wherein each of the storage devices maintains a cache entry of the tokens that were recently sent to said storage devices; and a seventh set of instruction codes for tracking the token in a token cache to monitor and limit consumption of the resources in the storage devices.

14. The computer program product of claim 13, wherein each of the storage devices monitors resource usage associated with each of the tokens.

15. The computer program product of claim 14, wherein if no client sends a command on the virtual session, determining that recent usage dropped below a predetermined threshold, and removing the cache entry associated with the virtual session.

16. The computer program product of claim 15, wherein the tokens carry an indication of the performance expected on the virtual session and the storage devices use, for determining a level of performance to provide to an application.

17. The computer program product of claim 14, wherein the tokens comprise expiration and authentication information to prevent improper copying of the tokens, and to ensure that only an authorized resource management system is capable of generating the tokens.

* * * * *